US009272385B2

(12) United States Patent
Guo et al.

(10) Patent No.: US 9,272,385 B2
(45) Date of Patent: Mar. 1, 2016

(54) MULTI-CARRIAGE DUAL-SPINDLE SYMMETRICAL GRINDING PROCESSING CENTER

(71) Applicant: Xiangtan Sanfeng CNC Machine Tool Co., Ltd., Xiangtan (CN)

(72) Inventors: Huaizhong Guo, Xiangtan (CN); Tianrun Guo, Xiangtan (CN)

(*) Notice: Subject to any disclaimer, the term of this patent is extended or adjusted under 35 U.S.C. 154(b) by 19 days.

(21) Appl. No.: 13/261,937

(22) PCT Filed: Jun. 9, 2013

(86) PCT No.: PCT/CN2013/077114
§ 371 (c)(1),
(2) Date: Aug. 8, 2014

(87) PCT Pub. No.: WO2013/185603
PCT Pub. Date: Dec. 19, 2013

(65) Prior Publication Data
US 2015/0140899 A1    May 21, 2015

(30) Foreign Application Priority Data
Jun. 15, 2012  (CN) .......................... 2012 1 0198093

(51) Int. Cl.
*B24B 25/00* (2006.01)
*B24B 49/12* (2006.01)
*B24B 53/00* (2006.01)

(52) U.S. Cl.
CPC ................. *B24B 25/00* (2013.01); *B24B 49/12* (2013.01); *B24B 53/00* (2013.01)

(58) Field of Classification Search
CPC .... B24B 27/0023; B24B 25/00; B24B 49/12; B24B 53/00; B24B 51/00; B24B 27/0027; B24B 27/0076; B24B 5/42; B23Q 1/015; B23Q 1/01; B23Q 1/626

USPC .................................................. 451/5, 72, 65
See application file for complete search history.

(56) References Cited

U.S. PATENT DOCUMENTS

| | | | | |
|---|---|---|---|---|
| 2,170,687 | A * | 8/1939 | Johnson ................... | B23Q 1/70 144/134.1 |
| 2,252,877 | A * | 8/1941 | Baldenhofer ............. | B24B 7/14 451/212 |
| 2,911,764 | A * | 11/1959 | Steggeman ............. | B24B 25/00 451/254 |
| 3,305,974 | A * | 2/1967 | Wilson ...................... | B24B 7/14 125/11.03 |
| 3,321,871 | A * | 5/1967 | Balamuth ............... | B24B 53/00 451/28 |

(Continued)

FOREIGN PATENT DOCUMENTS

| CN | 201279729 | * 7/2009 |
|---|---|---|
| CN | 202062273 | * 12/2011 |

*Primary Examiner* — George Nguyen
(74) *Attorney, Agent, or Firm* — Charles Liu (57) ABSTRACT

A multi-carriage dual-spindle symmetrical grinding processing center, wherein: A work table with a rotary table therein is positioned on a first carriage which is attached to a front base; first and second upright posts are positioned in a gantry form on a back base; a horizontal grinding head is connected to a second carriage between the upright posts; a third left carriage and a third right carriage are slidingly connected to the first and second upright posts, respectively, and a left slider and a right slider are connected to the third left carriage and the third right carriage, respectively; a vertical grinding head is installed at the front end of the right slider; an automatic tool changing device is equipped with the vertical grinding head, and a grinding wheel profile dressing device can be installed on the second carriage and on the left slider.

10 Claims, 9 Drawing Sheets

(56) References Cited

U.S. PATENT DOCUMENTS

| | | | | |
|---|---|---|---|---|
| 3,771,509 A * | 11/1973 | Murchie | | B24B 5/025 125/11.03 |
| 3,903,656 A * | 9/1975 | Binder | | B23Q 3/18 451/247 |
| 4,051,830 A * | 10/1977 | Gruber | | B24B 53/053 125/11.01 |
| 4,528,743 A * | 7/1985 | Bleich | | B24B 45/003 451/342 |
| 4,607,460 A * | 8/1986 | Mushardt | | B24B 51/00 451/226 |
| 4,761,918 A * | 8/1988 | Hirota | | B23Q 1/66 451/265 |
| 4,762,040 A * | 8/1988 | Alcantara Perez | | B24B 3/361 451/420 |
| 4,930,265 A * | 6/1990 | Belthle | | B23G 1/36 451/11 |
| 5,888,123 A * | 3/1999 | Wang | | B24B 21/00 451/182 |
| 6,004,195 A * | 12/1999 | Jaslow | | A61C 13/0027 451/391 |
| 6,120,358 A * | 9/2000 | Porter | | B24B 19/02 451/403 |
| 6,283,824 B1 * | 9/2001 | Mortell | | B23B 51/02 451/339 |
| 6,485,357 B1 * | 11/2002 | Divine | | B24B 7/04 451/194 |
| 6,682,407 B2 * | 1/2004 | Tokutake | | B22D 11/1265 451/194 |
| 7,195,543 B2 * | 3/2007 | Cousin | | B24B 53/053 451/21 |
| 7,238,087 B1 * | 7/2007 | Kashiwa | | B24B 7/228 451/287 |
| 2002/0081954 A1 * | 6/2002 | Mori | | B24B 7/04 451/65 |
| 2006/0217037 A1 * | 9/2006 | Kalanovic | | B24B 51/00 451/5 |

* cited by examiner

MULTI-CARRIAGE DUAL-SPINDLE SYMMETRICAL GRINDING PROCESSING CENTER

FIELD OF THE INVENTION

The present invention relates to machining equipment, and more particularly to a multi-carriage dual-spindle symmetrical grinding processing center.

BACKGROUND OF THE INVENTION

Conventional grinding machines are usually designed to have a grinding head with a plug-in structure. The grinding machines of such type are often undesirable in operation, for example, with low stability and low machining precision; grinding machines with moving-carriages commonly have relatively narrow process rage; gantry-type grinding machines with guiding rails may also have some unsatisfactory features, for example, the machines are usually too bulky, the grinding wheel finish processes of the machines are low in precision as manual or semiautomatic electro-hydraulic handlings being required, and the modes and functions of the machining processes are not sufficient to meet the needs for certain complex machining tasks.

Of such conventional grinding machines, moreover, the work table and work-pieces are often restricted to be moved in a side-to-side or left-to-right motion along the guide rails on the base, and it would be impossible in a single operation to achieve the entire or at least a portion of a machining process performed on a horizontal surface, vertical surface, end-surface and other complex curved-surface. On the other hand, processing efficiency is low, in-process grinding wheel dressing cannot be performed, and machining accuracy is low due to accumulated errors or deviations introduced by repeated clamping or loading operations. Especially, it is impossible to perform grinding processes on a hemi-spherical surface, non-spherical surface, or the inner or outer surface of a cylindrical kit.

Additionally, conventional grinding machines usually have not implemented with any advanced numerical control system and suitable system software for grinding processes to meet the requirements for high-precision, high-efficient and intelligent grinding processes.

SUMMARY OF THE INVENTION

Accordingly, the present invention is directed to provide a multi-carriage dual-spindle symmetrical grinding processing center, which is advantageously high in process capacity, process efficiency and process precision.

In one aspect, the present invention provided a multi-carriage dual-spindle symmetrical grinding processing center, and, as described herein, the grinding processing center comprises a front base, a back base, a work table, a first upright post, a second upright post, a first carriage, a second carriage, a third left carriage, a third right carriage, a first grinding head, and a second grinding head; wherein:

The first carriage is slidingly attached to and slidable in a back and forth motion on the front base, the work table is slidingly attached to and movable in a left and right motion on the first carriage, and a rotary table is installed on the work table;

the second carriage is installed between the first upright post and the second upright post, and the first upright post and the second upright post are positioned symmetrically in an arch-like form on the back base;

the third left carriage is connected to the outer side of the first upright post and can slide up and down along the first upright post, and a left slider is attached to and slidable in a back and front motion on the third left carriage;

the third right carriage is connected to the outer side of the second upright post and can slide up and down along the second upright post, and a right slider is attached to and slidable in a back and front motion on the third right carriage;

the first grinding head, horizontally positioned and forwardly extended above the work table, is slidingly attached to the front end of the second carriage, and is slidable in a up and down motion driven by the second carriage and slidable in a back and front motion along the second carriage; and the second grinding head, vertically positioned, is slidingly attached to the front end of the right slider on the third right carriage, and can be automatically rotated.

The grinding processing center may further comprise an automatic tool changing device, wherein the device is installed along with the second grinding head and comprises a tool magazine and a mechanical arm.

The grinding processing center may further comprise a grinding wheel profile dresser, wherein the grinding wheel profile dresser is installed on the second carriage and on the front end of the left slider on the third left carriage, and positioned with a elevation angle for the first grinding head being able to perform on-line inspection and wheel dressing.

In one preferred embodiment of the grinding processing center, the second grinding head can be automatically rotated in 120 degrees.

In another preferred embodiment, the grinding wheel profile dresser is positioned with an elevation angle of 35 degrees.

The grinding processing center may also have such features: the grinding wheel profile dresser comprise a grinding wheel dressing kit and a laser detection device; the grinding wheel dressing kit comprises a diamond stylus, a threaded rod connected to the grinding wheel dressing kit, and a servo motor for driving the threaded rod; the laser detection device comprises an optical grating rule; the grinding wheel dressing kit and the laser detection device are connected to a computer control system; a grinding chip absorbing device is installed near the grinding wheel, the grinding chip absorbing device comprising a first electrode installed at a center of a wheel spindle and a second electrode installed near a grinding surface of the grinding wheel.

In some embodiments, the grinding processing center further comprises:

A first threaded rod being installed with the first carriage, and a first servo motor being installed on the front base to drive the first carriage through the first threaded rods;

a second threaded rod being installed with the second carriage and coupled with a second servo motor;

a plurality of guide rails being installed respectively with the first upright post and the second upright post, a transmission chamber being installed on the right side between the first upright post and the second upright post, a third servo motor and a third threaded rod being connected to the transmission chamber, the third threaded rod being installed on the second upright post and connected to the third right carriage, and the third left carriage shares the second threaded rod with the second carriage;

a fourth threaded rod being installed on the third left carriage, and a fourth servo motor being installed on the third right carriage to drive the left slider and the right slider; and a computer control system being coupled to the first servo motor, the second servo motor, the third servo motor, and the fourth servo motor, respectively.

In one preferred embodiment, the first carriage is slidable in a back and forth motion on the front base via hard rail sliding connection with two V-shaped guide rails and two flat-shaped guide rails, and is driven with a ball threaded rod.

In another preferred embodiment, an opening is formed in the first upright post to allow the third left carriage and the second carriage to be connected.

In another preferred embodiment, the height of the front base is no more than 470 mm, the height of the back base is no less than 600 mm, the thickness of the work table is no less than 320 mm; and the deflection of the second carriage is no than 0.10 mm.

In another preferred embodiment, the rotary table on the work table is a hydrostatic rotary table, and is positioned at the center of an axis of the second grinding head, and has a rotary precision ≤1 μm and an axial movement ≤1 μm.

In another aspect, the present invention provided also a computer numerical control (NC) system for the multi-carriage dual-spindle symmetrical grinding processing center.

In the multi-carriage dual-spindle symmetrical grinding machining center based on the present invention, a grinding wheel profile dresser can be installed to perform in-line inspection and automatic profile dressing on the first grinding head with high precision; as the front base, carriages and work table can move relatively in a back-and-front and/or left-and-right motion, and the rotary table can move relatively in a rotary motion, it is possible to achieve machining processes, with a single jig load, on a horizontal surface, vertical surface, end-surface, hemi-spherical surface, non-spherical surface, complex curved-surface, and the inner or outer surface of a cylindrical kit. Furthermore, the grinding machining center of the present invention has an advanced NC system, which enables on-line process inspection and can enhance the precision of the processes. For example, based on embodiments of this invention, the surface roughness is ≤Ra 0.16 μm.

The present invention will be further described in details with the embodiments and drawings below.

DETAILED DESCRIPTION OF EMBODIMENTS

Figure 1:
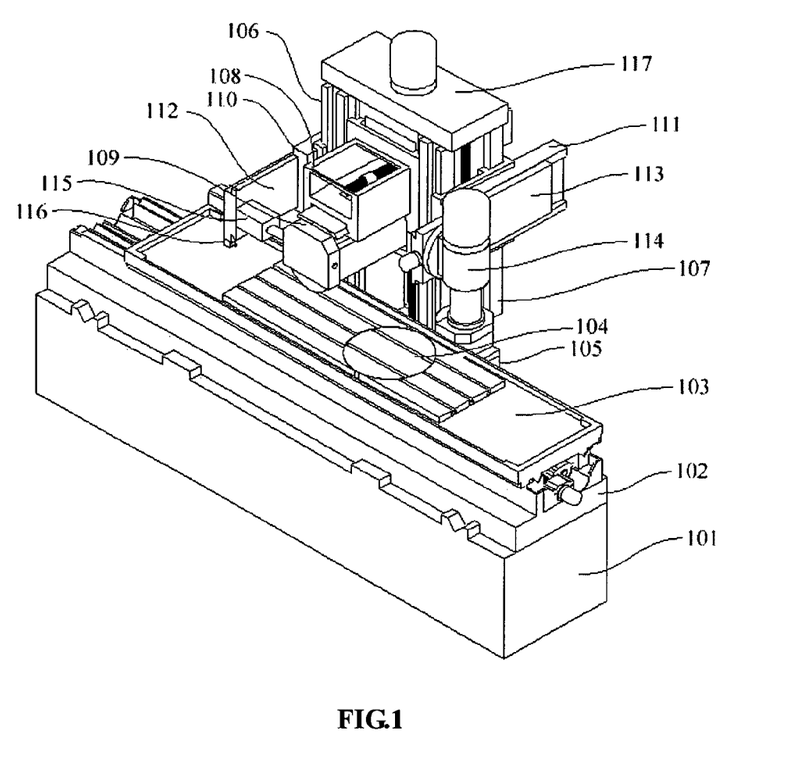
FIG. 1 is a schematic view of the structure of a multi-carriage dual-spindle symmetrical grinding processing center according to an embodiment of the present invention.

Referring to FIG. 1, in this embodiment, a first carriage 102 which can move in a back and front motion driven by a ball threaded rod is installed on four double V-shaped and double flat-shaped guide rails on a front base 101, a work table 103 which can move in a left and right motion driven by a threaded rod is installed on a double V-shaped guide rail of the first carriage 102, and a static pressure rotary table 104 which can rotate in 360 degrees is installed in the concave portion in the work table 103.

A first upright post 106 and a second upright post 107 are positioned symmetrically side by side in a gantry form on a back base 105 with multiple guide rails, and a second carriage 108 which can move in a front and back motion driven by a threaded rod is installed on the guide rails of the gantry of the upright posts. A first grinding head 109, positioned horizontally, which can move in a front and back motion driven by a threaded rod is installed in the second carriage 108 extended forwardly over the work table 103, a first grinding head 109 can move in an up and down motion brought by the second carriage 108, and the first grinding head 109 can also slide in a front and back motion in the second carriage 108. A rotary table 104 is positioned corresponding to the center of a second grinding head 114, and has preferably a radial rotation precision of ≤1 μm and an axial endplay of ≤1 μm.

A third left carriage 110 and a third right carriage 111 are slidingly connected respectively to two parallel guide rails on the outer sides of the first upright post 106 and the second upright post 107, a left slider 112 and a right slider 113 are slidingly connected respectively to in the third left carriage 110 and the third right carriage 111, the third left carriage 110 and the third right carriage 111 can slide in a up and down motion along respectively the guide rails of the first upright post 106 and the second upright post 107, and the left slider 112 and the right slider 113 can slide in a back and front motion respectively in the third left carriage 110 and the third right carriage 111. The second grinding head 114, positioned vertically, is installed on a rotatable board attached to the front end of the right slider 113 on the third right carriage 111, and a servo motor can drive the rotatable board through a turbine vortex in the rotatable board, and drive the second grinding head 114 to rotate in 120 degrees.

Figure 4:
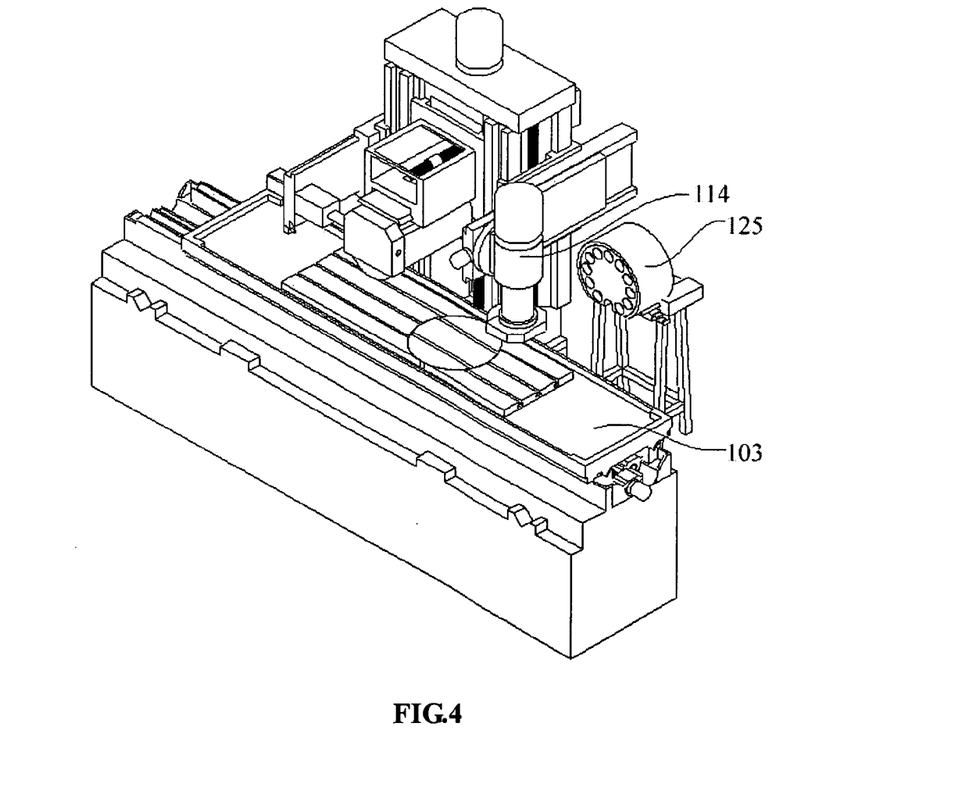
FIG. 4 is a schematic diagram view of the structure of a multi-carriage dual-spindle symmetrical grinding processing center installed with an automatic tool changing device on the second grinding head according to another embodiment of the present invention.

Referring to FIG. 4, the second grinding head 114 is equipped with an automatic tool changing device 125, including a tool magazine and a mechanical arm, used for exchange of various grinding wheels and milling cutters to meet needs of different processes. The tool magazine stores cutters for grinding wheel and can accurately deliver a replacing cutter to a desired position for the mechanical arm to accomplish the replacement of the cutters of the grinding wheel. Preferably, a tool magazine of cloak-type is structurally simple and compact, the grinding wheels and cutters are arranged in a single circle, and generally no more than 36 of the cutters are equipped; the tool magazine with a disk-like structure can be placed on besides the upright spindle. The mechanical arm is driven by a servo motor or with a mechanical cam connection.

Figure 3:
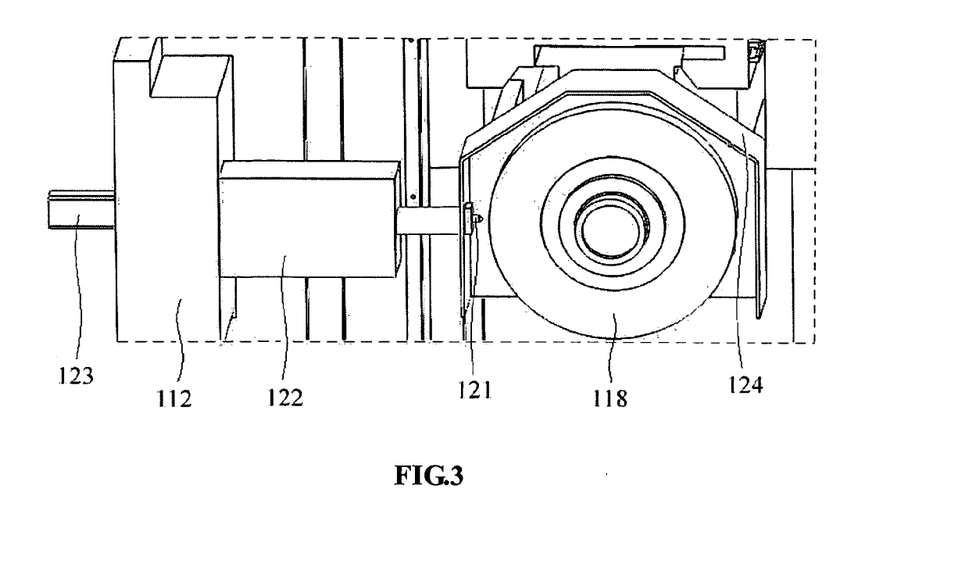
FIG. 3 is a schematic partial view illustrating the installation of a grinding wheel dressing kit shown in FIG. 1.

A grinding wheel profile dresser can be installed at the front end of the left slider 112 on the second carriage 108, wherein the grinding wheel profile dresser includes a grinding wheel dressing kit 115 and a laser detection device 116. As shown in FIG. 1, the laser detection device 116, an optical grating rule for example, is installed below the front end of the left slider 112. Referring to FIG. 3, the grinding wheel profile kit 115 may include a diamond stylus 121, a vertical threaded rod which is installed in the installing base 122 which is connected to diamond stylus 121, and a servo motor 123 which drives the threaded rod. In the figure, a grinding wheel guard 124 is also shown.

Figure 2:
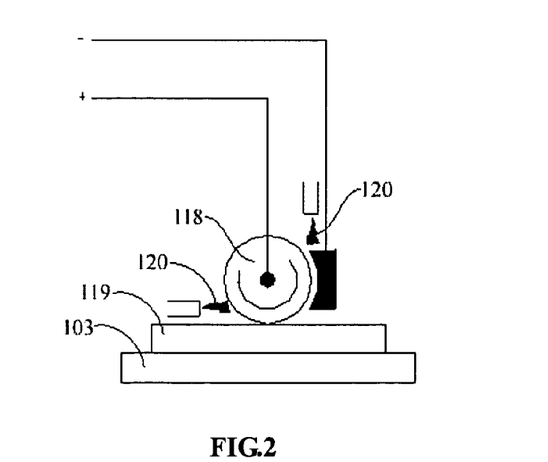
FIG. 2 is a schematic view of a grinding chip adsorption device of the grinding processing center of FIG. 1.

Referring to FIG. 2, the first grinding head 109 can be equipped with a grinding chip absorption device, which includes a first electrode and a second electrode installed respectively at a center of a wheel spindle and near a grinding surface of the grinding wheel. When the electrodes are charged with electricity, the two electrodes will form a electromagnetic field pointing outwardly from the axial center, and thus grinding chips and particles will be attracted by the electrodes positioned on the outside of the grinding wheel, so as to keep the grinding wheel clean and smooth, and also ensure the surface of the work-pieces smooth. A grinding wheel 118, a work-piece 119 and a chilled chemical solution 120 are also shown in FIG. 2. Preferably, the wheel profile dresser is coupled with a NC system device in 35 degrees to ensure on-line or in-process detection and profile dressing of the first grinding head through the three-axle linkage.

Multiple first threaded rods are installed with the first carriage 102 which is movable by driving through the threaded rods with first servo motor and second servo motor installed on the base, wherein one servo motor is used from the front to pull the carriage and the other carriage is used from the back to push the carriage; a second threaded rod is installed with the second carriage 108 and is coupled to the second servo motor; multiple guide rails are installed with the first upright post 106 and the second upright post 107, a transmission chamber 117 is installed on the right side between the first upright post 106 and the second upright post 107 and is connected to a third servo motor and a third threaded rod, the third threaded rod is installed on the second upright post 107 and is connected to the third right carriage 111, and the left third carriage 110 shares the second threaded rod with the second carriage 108. An opening is formed in the first upright post 108 to allow the third left carriage 110 and the second carriage 108 being connected. On the third left carriage 110 and the third right carriage 111 are set respectively a fourth threaded rod and a fourth servo motor which drives the left slider 112 and the right slider 113; each of the servo motors is respectively coupled to a NC system.

Preferably, the height of the front base 101 is no more than 470 mm, the height of the back base 105 is no less than 600 mm, and the thickness of the work table 103 is no less than 320 mm.

Preferably, the second carriage 108, which is positioned in the guide rails set on the upright posts positioned symmetrically side by side in a gantry form, has a guide rail deflection of no more than 0.10 mm.

For convenience, the grinding processing center and the components thereof are described herein with respect to orthogonally oriented linear exes, wherein the X axis is oriented from left to right, the Y axis is oriented from front to back, and the Z axis is oriented from bottom to top. With the reference of the axes, the direction of a movement can be described accordingly, for example, as leftward or rightward, backward or forward, and downward or upward.

The axis for left and right longitudinal movement of the work table 103 is defined as X-axis, the axis for up and down movement of the horizontally positioned first grinding head 109 is defined as Z1-axis, the axis for front and back transverse movement of the first grinding head 109 is defined as Y1-axis; the axis for up and down movement of the vertically positioned second grinding head 114 is defined as Z2-axis, the axis for front and back transverse movement of the second grinding head 114 is defined as Y2-axis; the rotation axis for rotator movement of the second grinding head 114 brought by the rotatable board is defined as A-axis; the rotation axis of the static pressure rotary table 104 in the work table 103 is defined as C-axis.

Figure 12:
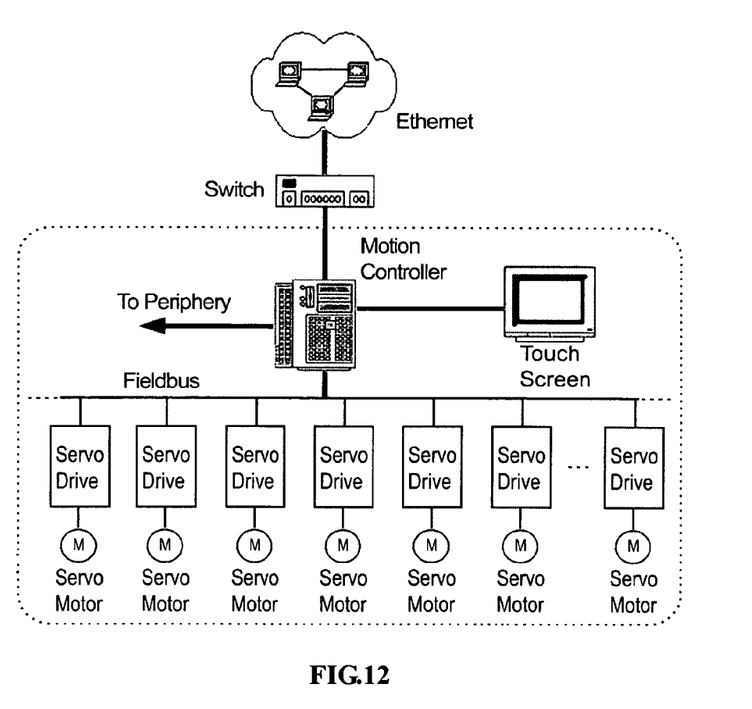
FIG. 12 is block diagram illustrating a system hardware module.

Referring to FIG. 12, each of the servo motors for driving at the above-mentioned seven axes is connected to the fieldbus via servo amplifiers respectively, the fieldbus is further connected to a motion controller, the motion controller is connected with a touch screen, and the motion controller is further connected to Ethernet through a switching device. This way, this seven-axis-five-linkage system of the grinding processing center can be achieved through a NC system with specially designed control software.

Figure 13:
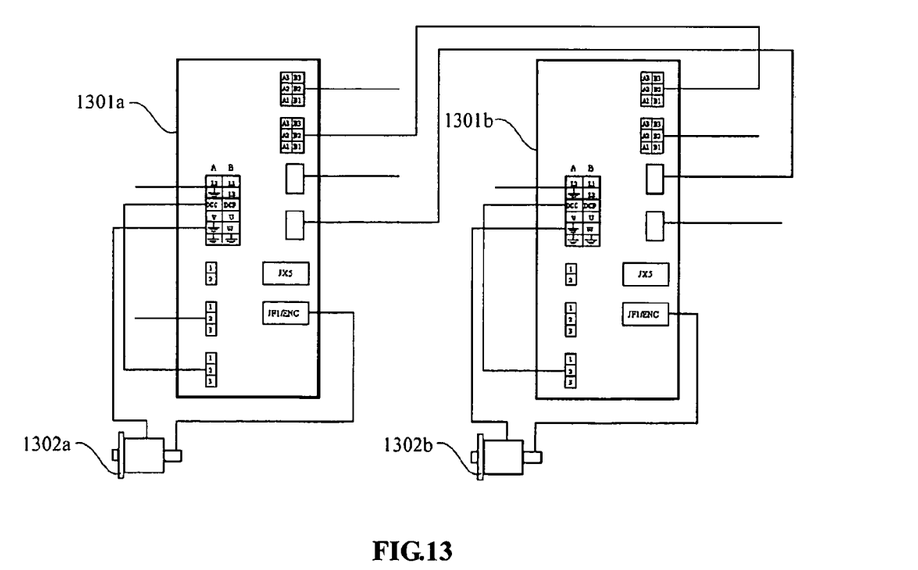
FIGS. 13, 14 and 15 are schematic diagrams illustrating connections of seven-axis servo motors and servo amplifiers.
Figure 14:
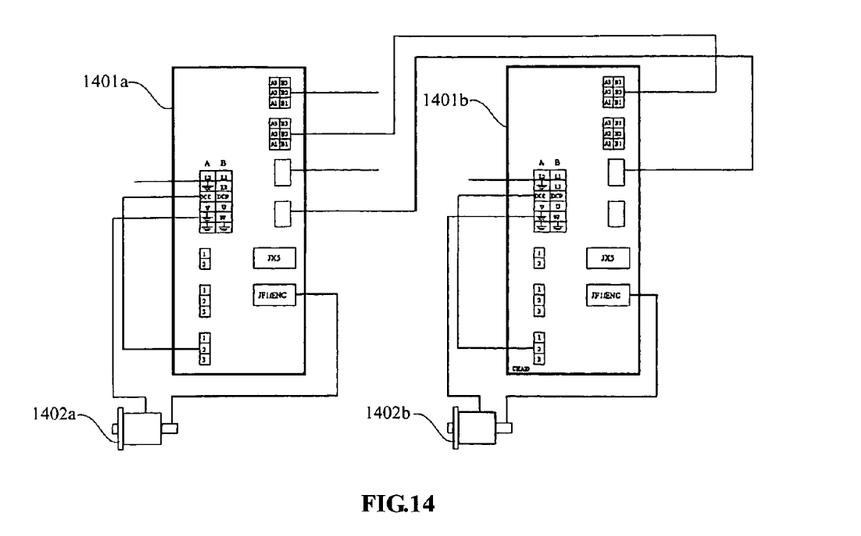
Figure 15:
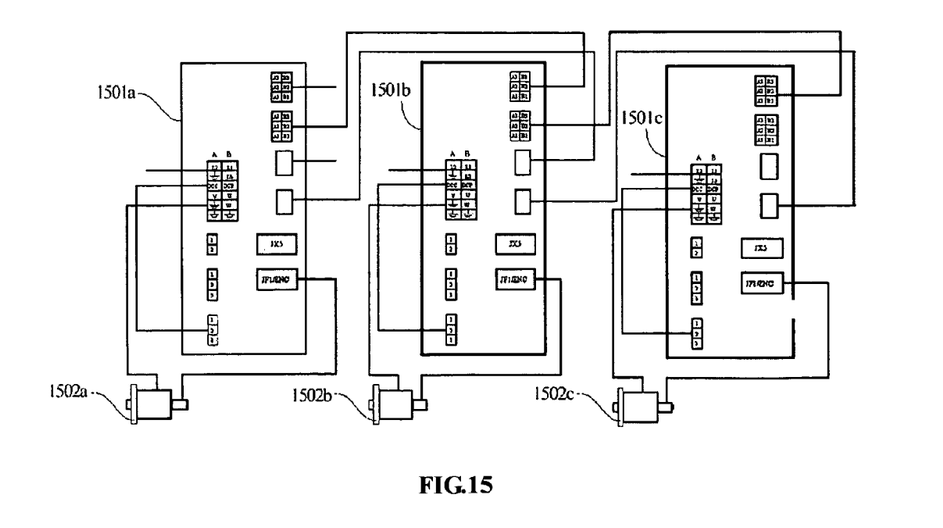

FIG. 13 to FIG. 15 are schematic diagrams illustrating connections of the seven-axis servo motors and servo amplifiers, including: a connection of the first grinding head vertical servo amplifier 1301a and the first grinding head horizontal servo amplifier 1301b and further with their respective servo motors 1302a and 1302b (FIG. 13), a connection of the second grinding head vertical servo amplifier 1401a and the second grinding head horizontal servo amplifier 1401b and further with their respective servo motors 1402a and 1402b (FIG. 14), and a connection of the second grinding head rotary table amplifier 1501a and the work table amplifier 1501b and the work table-rotary table amplifier further with their respective servo motors 1502a, 1502b and 1502c (FIG. 15).

Control of the precision of grinding wheel processing, as provided in this invention, is a combination of comprehensive system coordination and control rather than a simple technical approach. Such comprehensive system for precision control can be achieve by applying, such as, grinding wheel trajectory compensation, processing parameter optimization, and system adjustment for process units. The trajectory interference occurred during a NC grinding process is much more sophisticated than that for a process of NC turning or milling, and usually would have more serious influence on the processing precision.

Effective measures for precision control can be established by selecting appropriate wheel size and the trajectory track and orientation of the cutters with consideration of the deviation of wheel trajectory planning and effect of wheel interference.

Further the invented technologies relate to multi-axis linkage software developed on the basis of PLC (Programmable Logical Controller), and have the following advantageous features:

(1) Advanced PLC is used as the core for motion control, such that enhanced precision and reliability can be achieved;

(2) A touch screen is used as the human-machine operation interface, such that the performance becomes simple and straight forward;

(3) An AC servo system is used as the actuator, such that high control precision, quick response and stable operation can be achieved.

(4) The grinding processing center has functions of plane grinding and form grinding.

(5) The grinding processing center has functions of grinding on a curved-surface, hemi-spherical surface, non-spherical surface and inner or outer surface of a cylindrical kit of work-pieces.

(6) The grinding processing center has a function of automatic compensation for inverse batch.

(7) The grinding processing center has a function of automatic compensation for threaded rod pitch.

The control method of the grinding processing center described herein is generally achieved by a control system wherein the servo motors are connected via a fieldbus to a computer, and then via a switching device to the Ethernet (see FIG. 12). The remote computer is equipped with a touch-screen hardware platform structured with a dual-CPU based on the motion numerical control chip designed especially for ARM+FPGA, and a motion controller software platform which includes a database, a process intelligent optimization system and a NC process simulation system, for transfer of CAD data directly to the NC system with automatic cycle interrupting function.

Automatic programming for grinding processes of complex work-pieces:
Performing post processing based on the cutter location data, process parameters, as well as type of the current NC system to generate NC machining codes corresponding to the NC system. After being tested successfully, the motion simulation module is transferred to the NC grinding machine via data communication for actual grinding processes, so as to build an automatic programming platform for grinding processes of complex work-pieces.

Embedded computer NC system: Constructing a hardware platform of computer NC system based on a dual-CPU of motion NC chip used specially for ARM+FPGA, wherein the ARM controller, as being responsible mainly for running the management related tasks, is the major control CPU of the system; and the motion NC chip used specially for FPGA is responsible for the tasks, such as of running the interpolation computer, which require instantaneity and heavy computing capacity, and is used specially for sophisticated interpolation operations so as to reduce the load of the ARM processor.

Figure 6:
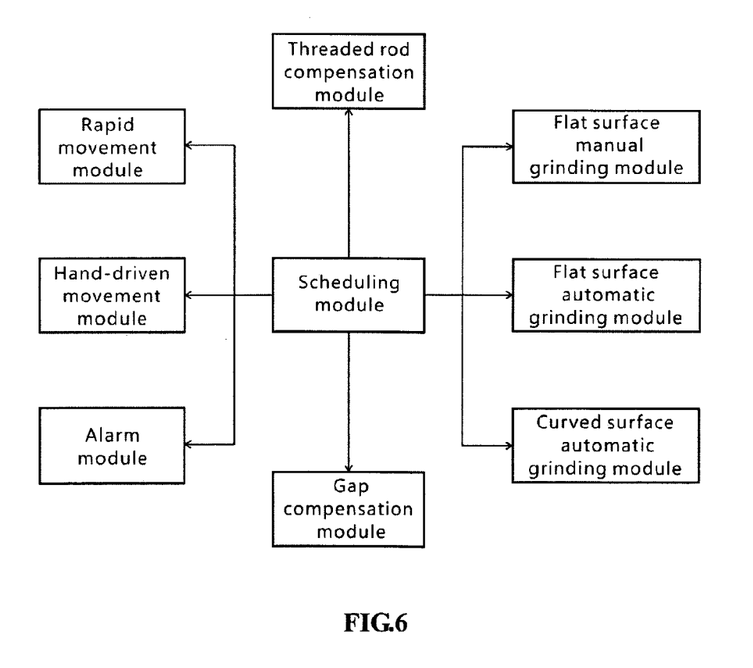
FIG. 6 is a block diagram illustrating the relationship between modules of an intelligent control system of according to another embodiment of the present invention.

Referring to FIG. 6, the control system consists of subsystem modules, which mainly include threaded rod compensation module, rapid movement module, hand-driven movement module, gap compensation module, flat-surface manual grinding module, flat-surface automatic grinding module, curved surface automatic grinding module, automatic tool changing module, scheduling module and alarm module. After treatment and computation based on the parameters set by the human-machine interface and threaded rod deviation compensation parameters, PLC sends corresponding pulse signals to a servo drivers, and the incremental encoder installed coaxial with the servo motor measures the displacement of the motion axis by measuring the angular displacement, then feedback to the servo controller, compare with the value set by position command, and use the deviation value obtained by the comparison to control each axis to move along the predetermined trajectory.

The lubrication system, as described herein, preferably is a loop gravity flow type automatic lubrication system for providing guide rails with constant pressure oil supply. Such lubrication system can be used to dealing with errors in the precision of guide rails for oil supply in electromagnetic pump clearance, and eliminate the influence caused by insufficient lubrication after reboot, so as to reduce maintenance costs and ensure normal operation of the machine.

The structural features of the grinding machines, as described herein, may meet the requirements of different techniques for forming processes and uninterrupted in-process dressing operation; the grinding chip adsorption device installed in the grinding wheel guard can be used to improve the quality of grinding surfaces; it is inventive and advantageous to use the complex part intelligent application technology for grinding processes and the grinding automatic programming platform. Such invented technologies can be used to ensure sufficient machining precision and surface quality for grinding on the work pieces with three-dimensional curved surfaces or other sophisticated surfaces, reduce duplication clamping operations, enhance process efficiency and stability, streamline the process flow, and reduce production costs.

The structural feature of lower front base and higher back base, as described herein, allows the horizontal grinding head to have effective tool stroke and appropriate machine height; the first carriage, which is movable in a front and back motion on four guide rails of double V-shaped and double flat guide rails, can ensure the horizontal geometric precision and the stability of the machine; the work table, which is movable in a left and right motion on the first carriage, together with the static pressure rotary table set in the concave part of the work table are arranged to meet the needs for the vertical grinding processes; the arrangement of the horizontally suspended first grinding head below the second carriage, which is inwardly held in the guide rails of the upright posts positioned symmetrically in a gantry form, may meet different requirements for processing on flat surfaces, curved surfaces and other special surfaces; two parallel guide rails set on both the left and right sides of the upright posts are provided to allow the left the right carriages movable in a up-and-down and left-and-right motion so as to control the left and right movement of the left and right sliders; the arrangement of the vertical grinding head accompanied with a 120-degree rotatable board set on the right slider will allow the grinding processes for semi-spherical surfaces, non-spherical surfaces, inner and outer cylindrical surfaces of work pieces; the optical grating rule and grinding wheel dresser installed on the left slider in the left carriage, which is in turn controlled by the second carriage, fits the needs for a broad range of grinding operations.

The double V-shaped and double flat four guide rails are installed on the front base, back base and the first carriage, and preferably, moreover, the guide rails can be of plastic coated, so that the machine. These features are advantageous to achieve high machine stability, high processing precision, sufficient rigidity and good vibration resistance; the symmetrically positioned upright posts with multiple guide rails are suitable for keeping appropriate balance and versatile functions of the machine.

The axes of the system, as described herein, are based on the ultralow-base and gravity-driven principle, which substantially improves the quality of the grinding processes and increases the durability of the machines.

The invented technologies as described above are suitable for a variety of advanced grinding processing equipment, especially suitable for intelligent NC grinding equipment for high-precision three dimensional processes.

FIGS. 5-11 are schematic illustrations on the intelligent NC system implemented to the grinding processing center based on embodiments of the present invention.

Figure 5:
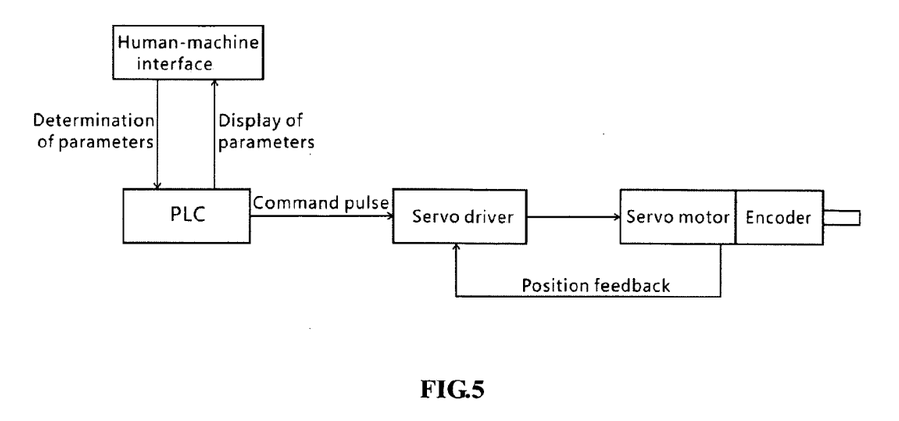
FIG. 5 is a block diagram illustrating the hardware of an intelligent control system according to another embodiment of the present invention.

As shown in FIG. 5, the movement of the grinding processing center is controlled through a human-machine interface, while motion commands are sent to PLC, the PLC drives the servo driver which in turn controls the running of the control motors, and the servo motor makes the encoder and servo driver to achieve closed-loop control.

The block diagram of FIG. 6 shows the relationship between the modules of the intelligent control system, and the flow diagrams of FIG. 7 to FIG. 11 illustrate the functions of different modules of the control system.

Figure 7:
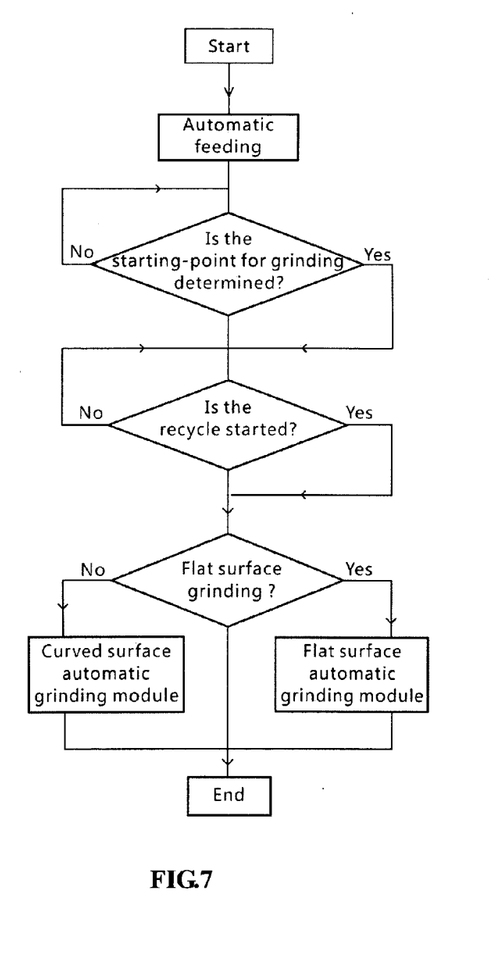
FIG. 7 is a flow diagram illustrating an automatic grinding module.
Figure 8:
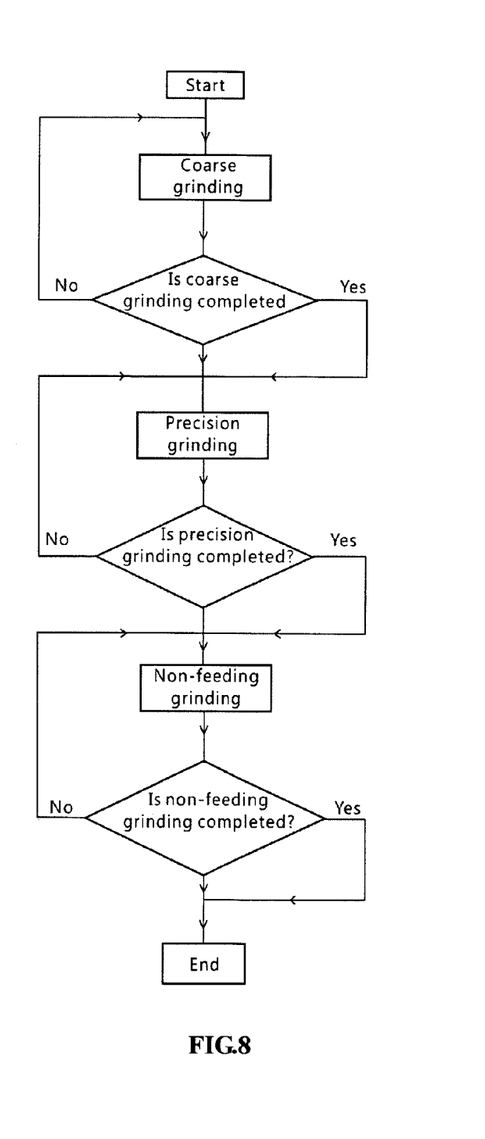
FIG. 8 is a flow diagram illustrating an automatic grinding module for flat-surface grinding.
Figure 9:
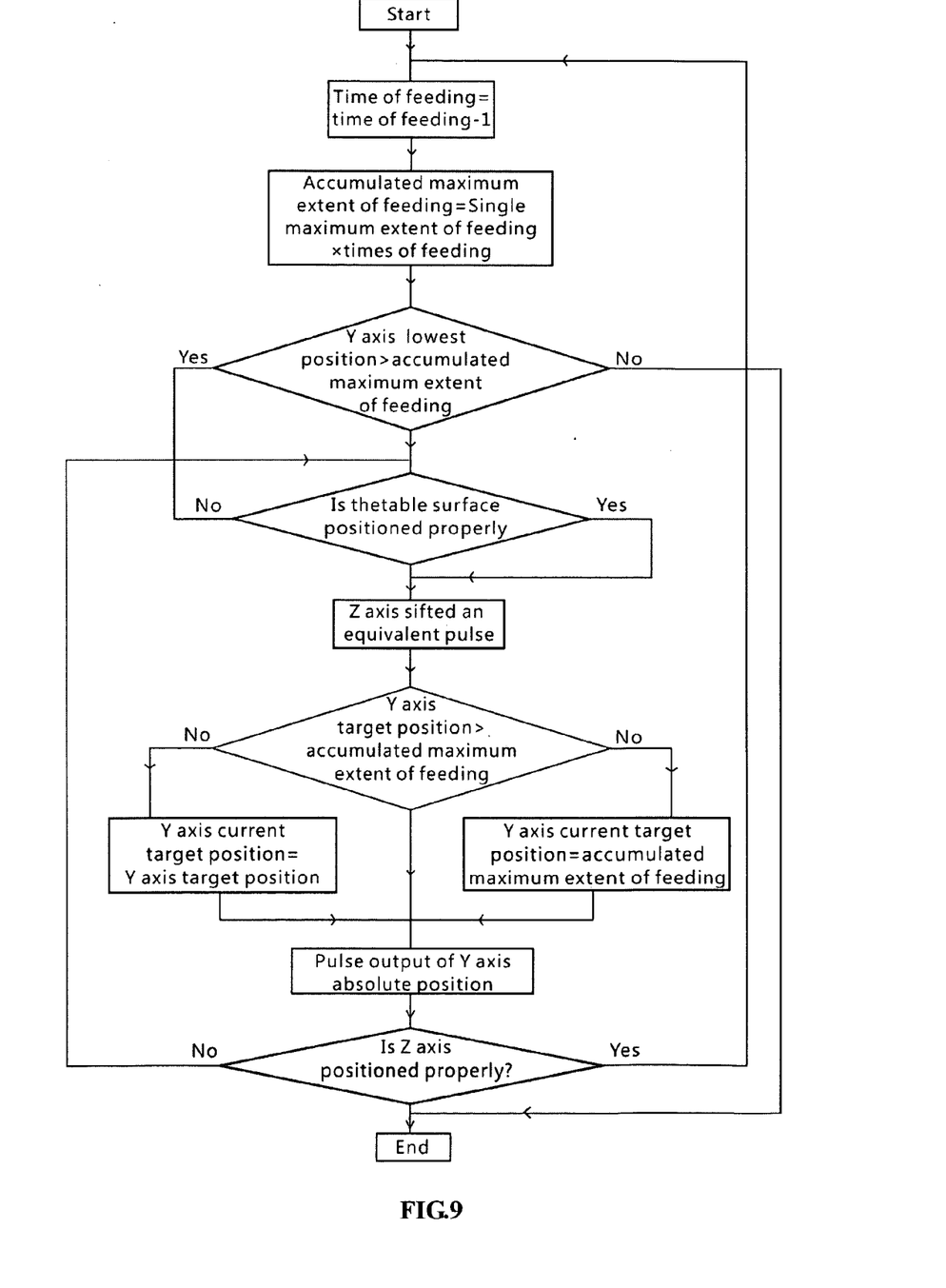
FIG. 9 is a flow diagram illustrating an automatic grinding module curved-surface grinding.
Figure 10:
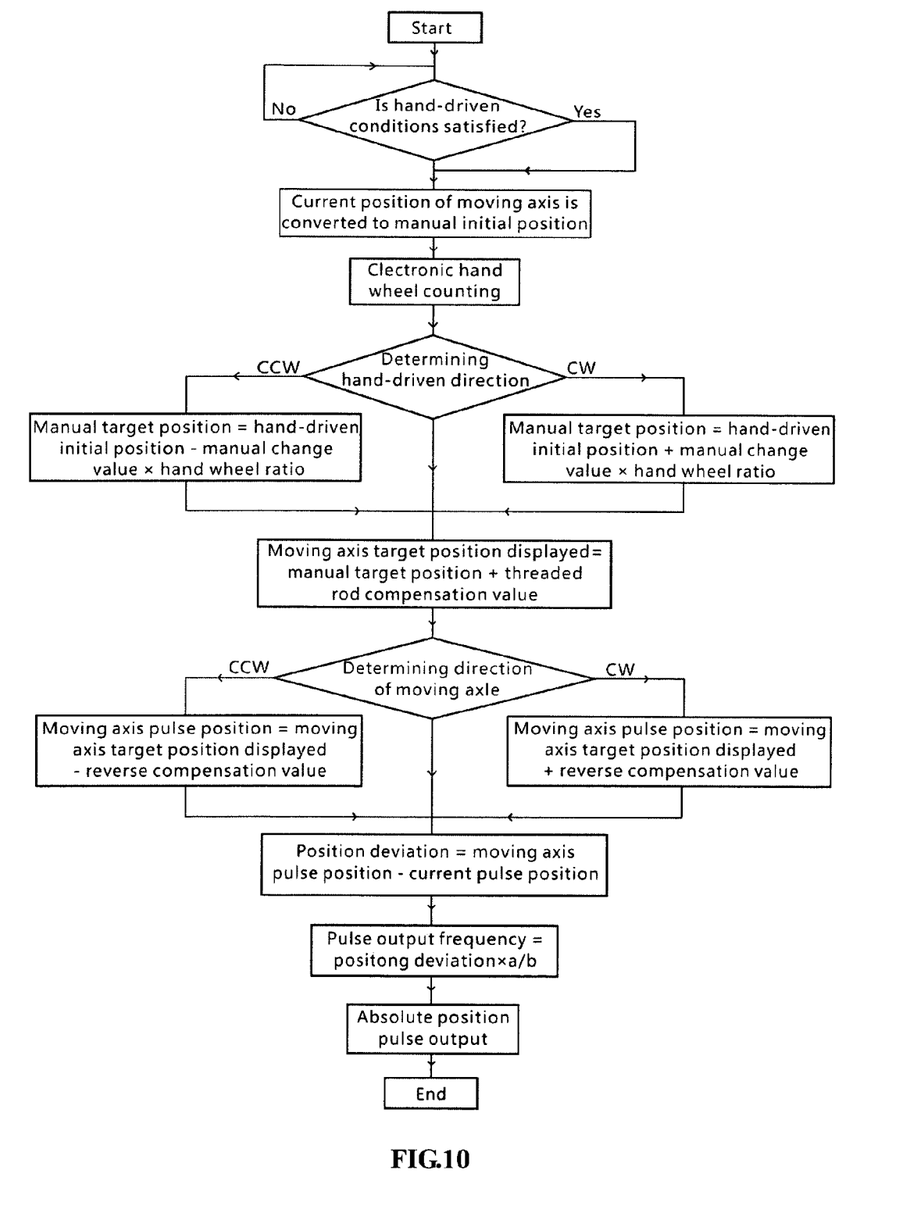
FIG. 10 is a flow diagram illustrating a hand-driven movement module.
Figure 11:
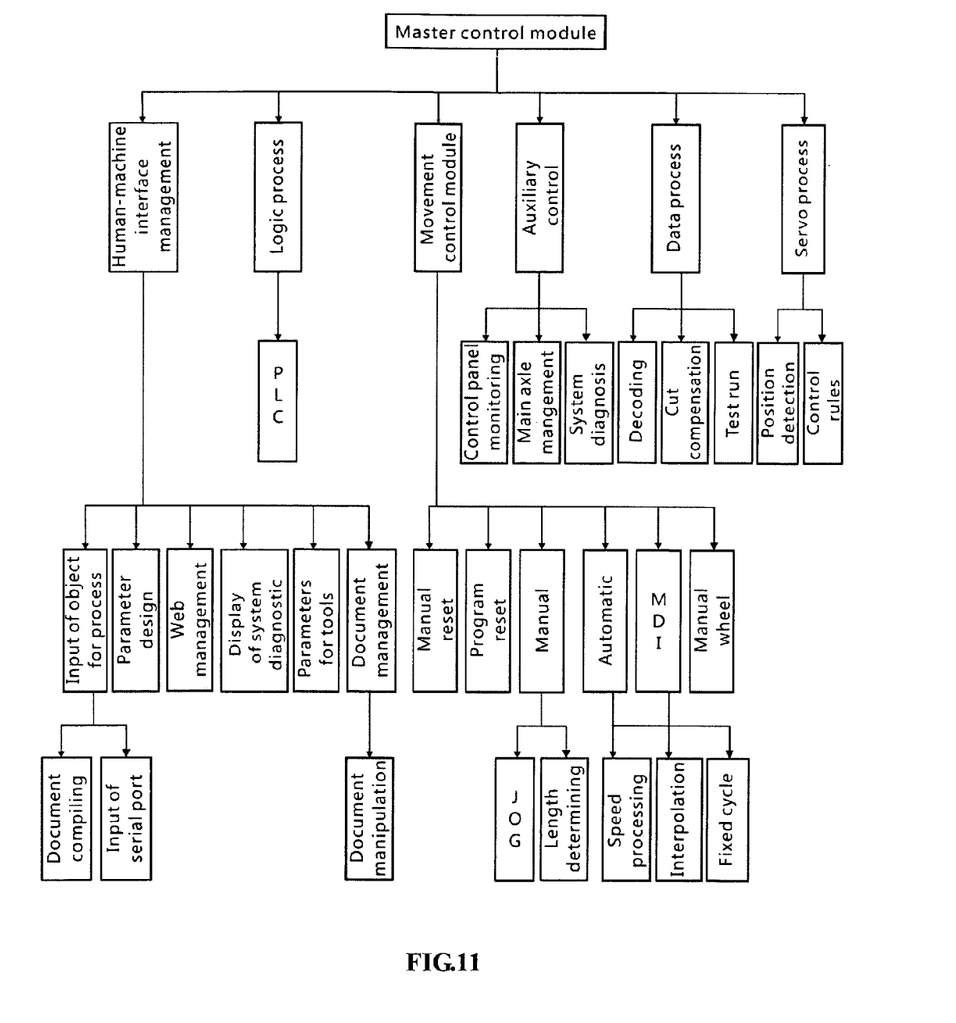
FIG. 11 is a block diagram illustrating a master control module, i.e., a scheduling module.

FIG. 7 illustrates an automatic grinding module; once a cycle begins, processes run automatically at Y-axis and Z-axis based on the desired parameters, and when a desired grinding amount is accomplished, the cycle ends automatically. FIG. 8 illustrates an automatic grinding module for flat-surface grinding, in the forms of coarse grinding, precision grinding and non-feeding grinding; once the non-feeding grinding is completed, the cycle ends automatically. FIG. 9 illustrates an automatic grinding module for curved-surface grinding; after the automatic grinding process starts, if the Y-axis target position is greater than the Y-axis lowest position, interpolation calculation is automatically performed at Y-axis and Z-axis, and then pulse output is provided based on the calculation result; if the Y-axis target position is less than the Y-axis lowest position, the curved-surface grinding ends automatically. FIG. 10 illustrates a process flow of a hand-driven movement module. FIG. 11 shows the master control module, i.e., scheduling module.

The terms "front," "back," "inner," "outer," "left," "right," "up" and "down," as used herein, are used to describe different orientations/directions of the location/movement of the components of the grinding machine stationed under ordinary operating conditions, which can be readily understood with the explanations provided above and with the reference of the illustrations depicted in FIG. 1 and FIG. 4. For the horizontal grinding head, for instance, the term " front " refers to the direction that the head faces and the term "outside" refers to a relative position of a component further away from the center of the base. In addition, with a reference of the orientation when an operator faces a grinding machine ordinarily positioned, the rightward and leftward movements are along the X-axis, forward and backward movements are alone the Y-axis, and upward and downward movements are along the Z-axis.

According to a preferred embodiment of the grinding processing center of the invention, some major parameters as listed below:

Maximum width of grinding: 800×1500
Maximum height of grinding: 800
Roughness of the grinding surface of work-pieces: Ra 0.1
Degree of parallelism between the grinding surface of the work-pieces and the base level: 500/0.004
Maximum difference in height of the curved surface workable in a grinding process: 150
Semispherical surface and non-spherical grinding: 630
Outer circle of a cylindrical kit: 630
Inner circle of a cylindrical kit: 130
NC resolution: 0.001 MM
Interpolation cycle of NC system: 4 ms
Positioning accuracy of the grinding machine: X (mm) 0.005/1500
Repeat positioning accuracy: X, Y1, Y2, Z1, Z2 (mm) 0.003

In the foregoing description and depiction, specific embodiments of the structure of the grinding processing center have been illustrated. It should be appreciated, however, that these structural features can be applied also to other types of machine tools. In addition, the same purpose may be achieved by substitution with other embodiments different from those described herein. The scope of the invention is, therefore, indicated by the claims rather than by the foregoing description. All variations or modifications which come within the meaning and range of equivalency of the claims are within the scope of the invention.

The invention claimed is:

1. A multi-carriage dual-spindle symmetrical grinding processing center, comprising a front base, a back base, a work table, a first upright post, a second upright post, a first carriage, a second carriage, a third left carriage, a third right carriage, a first grinding head, and a second grinding head; wherein:
    the first carriage is slidingly attached to and slidable in a back and forth motion on the front base, the work table is slidingly attached to and movable in a left and right motion on the first carriage, and a rotary table is installed on the work table;
    the second carriage is installed between the first upright post and the second upright post, and the first upright post and the second upright post are positioned symmetrically in a gantry form on the back base;
    the third left carriage is connected to the outer side of the first upright post and can slide up and down along the first upright post, and a left slider is attached to and slidable in a back and front motion on the third left carriage;
    the third right carriage is connected to the outer side of the second upright post and can slide up and down along the second upright post, and a right slider is attached to and slidable in a back and front motion on the third right carriage;
    the first grinding head, positioned horizontally and extended forwardly over the work table, is slidingly attached to the front end of the second carriage, and is slidable in a up and down motion driven by the second carriage and slidable in a back and front motion along the second carriage; and
    the second grinding head, positioned vertically, is slidingly attached to the front end of the right slider on the third right carriage, and can be automatically rotated.

2. The grinding processing center according to claim 1, further comprising an automatic tool changing device, wherein the device is installed along with the second grinding head and comprises a tool magazine and a mechanical arm.

3. The grinding processing center according to claim 1, further comprising a grinding wheel profile dresser, wherein the grinding wheel profile dresser is installed on the second carriage and on the front end of the left slider on the third left carriage, and positioned with a elevation angle for the first grinding head being able to perform on-line inspection and wheel dressing.

4. The grinding processing center according to claim 3, wherein the second grinding head can be automatically rotated in 120 degrees, and the grinding wheel profile dresser is positioned with an elevation angle of 35 degrees.

5. The grinding processing center according to claim 3, wherein: the grinding wheel profile dresser comprise a grinding wheel dressing kit and a laser detection device; the grinding wheel dressing kit comprises a diamond stylus, a threaded rod connected to the grinding wheel dressing kit, and a servo motor for driving the threaded rod; the laser detection device comprises an optical grating rule; the grinding wheel dressing kit and the laser detection device are connected to a computer control system; a grinding chip absorption device is installed near the grinding wheel, the grinding chip absorption device comprising a first electrode and a second electrode installed respectively at a center of a wheel spindle and near a grinding surface of the grinding wheel.

6. The grinding processing center according to claim 3, further comprising:
    a first threaded rod being installed with the first carriage, and a first servo motor being installed on the front base to drive the first carriage through the first threaded rods;
    a second threaded rod being installed with the second carriage and coupled with a second servo motor;

a plurality of guide rails being installed respectively with the first upright post and the second upright post, a transmission chamber being installed on the right side between the first upright post and the second upright post and being connected to a third servo motor and a third threaded rod, the third threaded rod being installed on the second upright post and being connected to the third right carriage, and the third left carriage shares the second threaded rod with the second carriage;

a fourth threaded rod being installed on the third left carriage, and a fourth servo motor being installed on the third right carriage to drive the left slider and the right slider; and a computer control system being coupled to the first servo motor, the second servo motor, the third servo motor, and the fourth servo motor, respectively.

7. The grinding processing center according to claim 1, wherein the first carriage is slidable in a back and forth motion on the front base via hard rail sliding connection with two V-shaped guide rails and two flat-shaped guide rails, and is driven with a ball threaded rod.

8. The grinding processing center according to claim 1, wherein an opening is formed in the first upright post to allow the third left carriage and the second carriage to be connected.

9. The grinding processing center according to claim 1, wherein a height of the front base is no more than 470 mm, a height of the back base is no less than 600 mm, a thickness of the work table is no less than 320 mm; and a deflection of the second carriage is no more than 0.10 mm.

10. The grinding processing center according to claim 1, wherein the rotary table on the work table is a hydrostatic rotary table, and is positioned at the center of an axis of the second grinding head, and has a rotation precision of $\leq 1$ μm and an axial endplay of $\leq 1$ μm.

* * * * *